United States Patent Office 2,950,325
Patented Aug. 23, 1960

2,950,325

PROCESS FOR MAKING FLUOROPHENOLS

Edgar C. Britton and Andrew J. Dietzler, Midland, Mich., assignors to The Dow Chemical Company, Midland, Mich., a corporation of Delaware No Drawing. Filed June 6, 1958, Ser. No. 740,214

8 Claims. (Cl. 260—623)

This invention concerns a method of hydrolyzing bromo-fluoro-substituted aromatic compounds to produce fluoro-substituted phenols. It relates more particularly to a method of carrying out the selective hydrolysis of a bromo-fluoro-aromatic compound having the general formula:

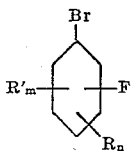

wherein R represents an alkyl radical containing from 1 to 18 carbon atoms and $n$ is an integer from 0 to 2, and R' represents a member of the group consisting of the phenyl, tolyl, xylyl, benzyl, alpha-methylbenzyl, phenethyl, cyclohexyl and methylcyclohexyl radicals and $m$ is an integer from 0 to 1, to produce the corresponding fluorophenol or a salt thereof. The invention also pertains to certain new chemical compounds which are fluoro-aryloxy-substituted phenols having the general formula:

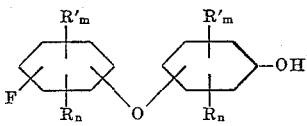

wherein R and R' and $n$ and $m$ have the meaning just given.

This application is a continuation-in-part of our copending application Serial No. 511,399, filed May 26, 1955 and now abandoned.

It is a primary object of the invention to hydrolyze a bromo-fluoro-substituted aromatic compound having the above general formula to produce the corresponding fluoro-substituted phenol. Another object is to provide a method for carrying out the aqueous hydrolysis of a bromo-fluoro-substituted aromatic compound having the aforementioned general formula whereby the bromine atom in the molecule is replaced by a hydroxyl group or the corresponding metal-oxy group to produce a corresponding fluorophenol or a salt thereof. Still another object is to provide a method of hydrolyzing a bromo-fluoro-substituted aromatic compound having the above formula to produce a fluoro-arloxy-substituted phenol having the general formula given above. A specific object is to provide a method of hydrolyzing 1-bromo-4-fluorobenzene selectivity to produce 4-fluorophenol. A further specific object is to provide a method of making para-(para-fluorophenoxy)phenol. Other and related objects may appear from the following description of the invention.

According to the invention the foregoing and related objects are attained by heating a bromo-fluoro-substituted aromatic compound having the above general formula with water and an alkaline earth metal oxide or hydroxide, at elevated temperatures and pressures and in the presence of copper or a copper-containing catalyst, as hereinafter described.

By carrying out the hydrolysis with an alkaline earth metal oxide or hydroxide, the reaction proceeds readily to form the corresponding fluorophenol in good yield and free from by-product substances such as phenol which is frequently formed when a strongly alkaline agent, e.g. potassium hydroxide or sodium hydroxide, is employed in the reaction. The fluorophenol product formed in the hydrolysis with an alkaline earth metal hydroxide can readily be recovered in usual ways, e.g. by crystallization or distillation, and as a product of high purity.

The alkaline earth metal compound can be an oxide or hydroxide of the elements calcium, barium or strontium, e.g. calcium oxide, calcium hydroxide, barium hydroxide, or strontium hydroxide. Mixtures of any two or more of such alkaline earth metal compounds can also be used. The hydrolysis is advantageously and preferably carried out employing calcium hydroxide.

The inorganic alkaline earth metal compound is employed in amount corresponding to from 0.25 to 2.5, preferably from 0.5 to 2, chemically equivalent proportions per gram atomic proportion of bromine in a gram molecular proportion of the bromo-fluoro-substituted aromatic compound.

When employing an oxide or hydroxide of an alkaline earth metal, e.g. calcium hydroxide, in the hydrolysis reaction in amount chemically equivalent, or less than chemically equivalent, to the bromine in the starting material, the product consists principally of the corresponding fluorophenol in its free form, the alkaline earth metal being consumed in forming the by-product bromide salt. For some purposes, e.g. in a continuous process, the hydrolysis reaction is preferably carried out employing water and an oxide or hydroxide of an alkaline earth metal, preferably calcium hydroxide, in amount corresponding to from 0.5 to 1 chemically equivalent proportion per gram atomic proportion of bromine in the bromo-fluoro-substituted aromatic compound starting material.

The inorganic alkaline earth metal compound is employed in admixture with water, preferably in amount corresponding to at least 250 cc. of water per gram molecular equivalent proportion of the bromo-fluoro-aromatic compound starting material employed.

The invention is susceptible of considerable variations and modifications in the manner of its practical application, particularly as regards the proportions of materials, pressures, reaction temperatures and the exact method of procedure.

The hydrolysis of a bromo-fluoro-aromatic compound having the aforementioned general formula, whereby the bromine atom is selectively replaced by an hydroxyl group or the corresponding metal-oxy group to produce a corresponding fluorophenol or a salt thereof as the major product, can be carried out at temperatures between 190° and 250° C., preferably from 200° to 240° C., and under a pressure at least as great as the autogenous pressure of the mixture of materials, i.e. at pressures sufficient to maintain the water in the reaction mixture substantially in liquid phase.

The conditions under which the hydrolysis can best be accomplished are dependent in part upon the bromo-fluoro-aromatic compound starting material. In some cases substituent groups or atoms, or the position of the bromine atom relative to the fluorine atom or to substituent groups, may activate the bromine atom so that reaction may proceed more readily.

The major product of the hydrolysis consists of the corresponding fluorophenol or a salt thereof, i.e. the product resulting from the selective replacement of the bromine atom in the bromo-fluoro-aromatic compound starting material by an hydroxyl group or the corresponding metal-oxy group. However, by-products such as fluoro-substituted phenoxy phenols, are also obtained as a minor product of the hydrolysis reaction.

The fluoro-substituted aryloxy phenols are new chemical compounds. They are useful as antioxidants, bactericides, fungicides and antimicrobial agents, and as intermediates in the preparation of more complex chemical compositions, e.g. surfactants, by reaction or condensation with alkylene oxides such as ethylene oxide, propylene oxide, or mixtures of such oxides, to form water-soluble polyoxyalkylene aryloxy ether alcohols suitable for use as emulsifying, wetting, or dispersing agents.

The hydrolysis reaction is carried out in the presence of copper or a copper-containing catalyst, preferably in a copper or a copper-lined pressure-resistant reaction vessel. The reaction vessel can be constructed of copper, nickel, or stainless steel. Iron or carbon steel vessels lined with copper can also be used.

Suitable catalysts for the reaction are copper, or the oxides, hydroxides, chlorides, bromides, and sulfates of the element copper. Any of the copper-containing catalysts which are employed in the alkaline hydrolysis of halobenzenes to produce a phenol can be used in the process of the invention. The catalyst is usually employed in an amount corresponding to from 0.03 to 0.1 gram molecular proportion of the catalyst per gram molecular equivalent proportion of the bromo-fluoro-aromatic compound starting material, although larger proportions can be used.

The method is hereinafter described with reference to bromofluorobenzenes having the empirical formulae $C_6H_4BrF$ and $CH_3C_6H_3BrF$, i.e. ortho-, meta- and para-bromofluorobenzene or any of the isomeric bromofluorotoluenes, since such bromo-fluoro-substituted aromatic compounds are the preferred starting materials. However, other bromofluorobenzenes having the aforementioned formula wherein the bromine and fluorine atoms are directly attached to different carbon atoms in the benzene nucleus such as 4-bromo-2-fluoro-ethylbenzene, 4-bromo-2-fluoro-octylbenzene, 4-bromo-2-fluoro-stearylbenzene, 2-bromo-5-fluoro-1,3-dimethylbenzene, 4-bromo-2-fluoro-phenylbenzene, 4-bromo-2-fluoro-cyclohexylbenzene, 4-bromo-2-fluoro-methylcyclohexylbenzene, 4-bromo-2-fluoro-benzylbenzene, 4-bromo-2-fluoro-alpha-methylbenzylbenzene, 4-bromo-2-fluoro-phenethylbenzene, 2-bromo-5-fluoro-6-phenyl-1,3-dimethylbenzene, or 2-bromo-5-fluoro-3-phenyl-6-stearyl-tert.-butylbenzene can be hydrolyzed as herein described to produce the corresponding fluorophenols as the major hydrolysis product, together with fluoroaryloxy-substituted phenols of the general formula previously given as a minor product.

In practice, the bromofluorobenzene starting material, e.g. 1-bromo-4-fluorobenzene, water and an inorganic alkaline earth metal compound as previously mentioned such as strontium hydroxide, calcium hydroxide, or barium hydroxide, is placed in a suitable pressure-resistant reaction vessel, e.g. a copper, stainless steel or nickel vessel, together with a copper catalyst, in the desired proportions. The mixture is agitated and heated under the autogenous pressure of the materials at temperatures between 190° and 250° C., preferably between 200° and 240° C., to effect the selective hydrolysis of the bromine atom and produce a corresponding fluorophenol or a salt thereof.

The fluorophenol product is recovered from the aqueous liquor in which it is formed by acidifying the aqueous liquor with an acid such as acetic acid, or hydrochloric acid, then extracting the aqueous acidic liquor with a water-immiscible organic liquid, e.g. benzene, toluene, chlorobenzene, or ethylene dichloride, which is a solvent for the fluorophenol. The fluorophenol product is separated from the organic solvent in usual ways, e.g. by distillation or by crystallization.

The hydrolysis reaction can be carried out batchwise or in continuous manner. For instance, in a continuouus process the bromofluorobenzene starting material and an aqueous solution, or suspension, of an alkaline earth metal oxide or hydroxide, as herein specified, can be fed into admixture with one another under pressure in a suitable reaction vessel, e.g. a tubular reactor, wherein the mixture is agitated and heated at reaction temperatures as herein stated in the presence of copper or a copper-containing catalyst under a pressure at least as great as the autogenous pressure of the mixture of the materials to effect the selective hydrolysis of the bromine atom and produce a corresponding fluorophenol or a salt thereof. The reacted mixture is passed to a neutralization zone wherein it is cooled and preferably neutralized or made acidic with an acid such as hydrochloric acid, hydrobromic acid or acetic acid, under pressure, after which the mixture is withdrawn or discharged from the neutralization zone. Neutralizing or making the reaction mixture acidic, e.g. bringing the same to a pH value between about 3 and 7, with a suitable acid, preferably acetic acid, while under pressure, facilitates the withdrawal of the mixture from a vessel through a pressure release valve in a continuous process. It prevents or substantially reduces the tendency toward plugging of the release valve by insoluble substances, e.g. calcium hydroxide.

The reaction is usually complete in a period of from 0.5 to 5 hours or less, although in some instances longer reaction times may be required, depending in part upon the temperatures and the bromofluorobenzene starting material employed in the process.

The following examples illustrate ways in which the principle of the invention has been applied but are not to be construed as limiting its scope.

EXAMPLE 1

A charge of 52.5 grams (0.3 mole) of 1-bromo-4-fluorobenzene, 25.6 grams (0.35 mole) of calcium hydroxide and 150 cc. of water was placed in a copper bomb. The mixture was agitated and heated at temperatures between 228° and 232° C. under the autogenous pressure of the materials for a period of 3.25 hours, then cooled. The hydrolysis mixture was poured from the bomb and the bomb rinsed with water. A total of 280 cc. of aqueous liquor was obtained. The aqueous liquor had a pH value of 10.1. It was analyzed for bromide. The conversion was 98 percent. The aqueous liquor was acidified with concentrated hydrochloric acid solution. Thereafter, sodium chloride was added with stirring to form a saturated aqueous solution. This liquor was extracted four times, each with a 50 cc. portion of benzene. The benzene solutions were combined and fractionally distilled to recover the fluorophenol product. There was obtained 26.8 grams (0.24 mole) of para-fluorophenol boiling at temperatures between 89° and 100° C. at 25 millimeters absolute pressure and 4.5 grams of higher boiling liquid residue. The product had a freezing point of 46.2° C. The yield of said product was 80 percent based on the 1-bromo-4-fluorobenzene initially used.

EXAMPLE 2

A charge of 52.5 grams (0.3 mole) of 1-bromo-3-fluorobenzene, 25.6 grams (0.35 mole) of calcium hydroxide and 150 cc. of water was placed in a copper-lined steel bomb. The mixture was agitated and heated at temperatures between 196° and 201° C. under the autogenous pressure of the materials for a period of 5 hours, then cooled. The product was recovered by procedure similar to that described in Example 1. There were obtained 24.2 grams of unreacted 1-bromo-3-fluorobenzene boiling at 54°–57° C. at 25 millimeters absolute pressure and 9.1 grams (0.08 mole) of metafluorophenol boiling at 87.5°–88° C. at 25 millimeters pressure. The meta-fluorophenol product had a freezing point of 13.1° C.

EXAMPLE 3

A charge of 56.6 grams (0.3 mole) of 4-bromo-2-fluorotoluene, 25.6 grams (0.35 mole) of calcium hydroxide and 150 cc. of water was placed in a copper bomb. The mixture was agitated and heated at temperatures between 228° and 231° C. for a period of 12 hours, then cooled. The product was recovered by procedure similar to that described in Example 1. There was obtained 23.8 grams (0.19 mole) of 3-fluoro-p-cresol boiling at temperatures between 105° and 110° C. at 25 millimeters absolute pressure. The product had a freezing point of 30.1° C.

EXAMPLE 4

In each of a series of experiments a charge of 52.5 grams (0.3 mole) of 1-bromo-4-fluorobenzene, 150 cc. of water and an alkaline earth metal hydroxide of a kind and in amount as stated in the following table, was placed in a copper bomb. The mixture was agitated and heated at temperatures as stated in the table under the autogenous pressure of the materials for a period of 5 hours, then cooled. The fluorophenol product was recovered from the hydrolysis mixture by procedure similar to that employed in Example 1. Table I identifies the experiments and gives the amounts of the starting materials employed. The table gives the conversion as determined by analysis of the aqueous hydrolysis liquor for bromide, the weight in grams of the 4-fluorophenol product, its freezing point and the percent yield of said product, based on the 1-bromo-4-fluorobenzene consumed in the reaction.

For purpose of comparison, hydrolysis of 1-bromo-4-fluorobenzene was carried out under similar conditions employing sodium hydroxide, potassium hydroxide and sodium carbonate, respectively, as the alkaline compound, and the results obtained are included in the table.

melting at 95.5°–96° C. The product was analyzed. It contained:

|   | Found, percent | Theory, percent |
|---|---|---|
| H | 4.3 | 4.4 |
| C | 70.5 | 70.5 |

The para-(para-fluorophenoxy)phenol is a new compound having the formula:

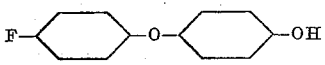

The product was tested and found to be one hundred percent effective in a concentration of 0.05 percent for the control of bacteria of the type *Salmonella typhosa*, *Staphylococcus aureus*, and fungi of the type *Aspergillus terreus* and *Rhizopus nigricans*.

EXAMPLE 6

A charge of the para-(para-fluorophenoxy)phenol obtained in Example 5 was mixed with a standard malt-yeast agar culture medium in amount sufficient to form a mixture containing 0.01 percent by weight of the para-(parafluorophenoxy)phenol. The mixture was poured into a Petri dish and allowed to harden. Thereafter it was inoculated with *Aspergillus terreus* and incubated at a temperature of 30° C. for a period of four days. The mixture was then examined to determine growth of the mold. No mold was observed. The para-(para-fluorophenoxy)phenol was effective in inhibiting growth of the *Aspergillus terreus*.

For purpose of comparison, a culture medium mixture was prepared employing 0.01 percent by weight of

*Table I*

| Run No. | Starting Materials | | | Reaction Conditions | | | Conversion, percent | 4-Fluorophenol Product | | |
|---|---|---|---|---|---|---|---|---|---|---|
| | 1-Bromo-4-fluorobenzene, gm. mole | Alkaline Compound | | H₂O, cc. | Temperature, °C. | Time, Hrs. | | Weight, gms. | Freezing Point, °C. | Yield, percent |
| | | Kind | gms mole | | | | | | | |
| 1 | 0.3 | Ca(OH)₂ | 9.3 | 150 | 229–231 | 5 | 99.5 | 25.3 | 46.3 | 75.5 |
| 2 | 0.3 | Ca(OH)₂ | 0.25 | 150 | 227–233 | 5 | 99.4 | 25.6 | 46.3 | 76.4 |
| 3 | 0.3 | Ca(OH)₂ | 0.2 | 150 | 227–233 | 5 | 100 | 24.8 | 46.4 | 74 |
| 4 | 0.3 | Ca(OH)₂ | 0.15 | 150 | 227–233 | 5 | 77.5 | 20 | 46.7 | 72.5 |
| 5 | 0.3 | Ca(OH)₂ | 0.1 | 150 | 227–233 | 5 | 67 | 10.7 | 46.1 | 70.5 |
| 6 | 0.3 | Ba(OH)₂ | 0.3 | 150 | 230–235 | 5 | 100 | 25.6 | 47.1 | 76.4 |
| 7 | 0.3 | Sr(OH)₂ | 0.3 | 150 | 230–235 | 5 | 100 | 26.7 | 46.0 | 79.5 |
| 8 | 0.3 | NaOH | 0.6 | 200 | 230–233 | 3.5 | 98 | 22.9 | 43.7 | 68.4 |
| 9 | 0.3 | KOH | 0.6 | 150 | 200–202 | 6 | 83.5 | 20.8 | 44 | 62.0 |
| 10 | 0.3 | Na₂CO₃ | 0.3 | 150 | 230–235 | 5 | 100 | 16.8 | 46.7 | 50.1 |

EXAMPLE 5

A charge of 32 grams of the residue material, collected from experiments carried out on the hydrolysis of 1-bromo-4-fluorobenzene with water and calcium hydroxide by procedure similar to that employed in Example 1, was fractionally distilled. There were obtained 15.6 grams of a fraction herein called fraction A boiling at temperatures of 136°–152° C. at 23 millimeters absolute pressure, 8.1 grams of a fraction identified as fraction B boiling at temperatures of 164°–177° C. at 8 millimeters and 8.3 grams of residue. Fraction A was redistilled to yield 12.2 grams of para-fluorophenyl phenyl ether boiling at 247°–248° C. at 744 millimeters. Fraction B was a crystalline material. It was recrystallized from petroleum ether (boiling point 86°–100° C.), then recrystallized three times from carbon tetrachloride to yield 4.7 grams of para-(para-fluorophenoxy)phenol as white crystals paraphenoxyphenol and the mixture tested in similar manner. After four days, substantial growth of the *Aspergillus terreus* was observed. The para-phenoxyphenol was not effective to inhibit growth of the mold.

We claim:

1. A method of hydrolyzing a bromo-fluoro-substituted aromatic compound to produce a fluorine-containing phenol, which method comprises heating a mixture consisting of one gram molecular proportion of a bromo-fluoro-substituted aromatic compound having the general formula:

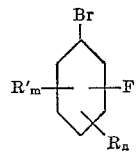

wherein R represents an alkyl radical containing from 1 to 18 carbon atoms and $n$ is an integer from 0 to 2, and R' represents a member of the group consisting of the phenyl, tolyl, xylyl, benzyl, alpha-methylbenzyl, phenethyl, cyclohexyl and methylcyclohexyl radicals and $m$ is an integer from 0 to 1, from 0.25 to 2.5 chemically equivalent proportions of at least one inorganic alkaline earth metal compound selected from the group consisting of the oxides and hydroxides of an alkaline earth metal, based on a gram atomic weight of the bromine in the bromo-fluoro-substituted aromatic compound, and water at reaction temperatures between 190° and 250° C. under a pressure at least as great as the autogenous pressure of the mixture of the materials and in the presence of a copper-containing catalyst.

2. A process as claimed in claim 1, wherein the inorganic alkaline compound is an alkaline earth metal hydroxide.

3. A method of hydrolyzing 4-bromo-1-fluorobenzene to produce 4-fluorophenol, which method comprises heating a mixture consisting of one gram molecular proportion of the 4-bromo-1-fluorobenzene, from 0.25 to 2.5 chemically equivalent proportions of an inorganic alkaline earth metal compound selected from the group consisting of the oxides and hydroxides of an alkaline earth metal, based on a gram atomic weight of the bromine in the 4-bromo-1-fluorobenzene, and water at reaction temperatures between 190° and 250° C. under a pressure at least as great as the autogenous pressure of the mixture of the materials and in the presence of a copper-containing catalyst.

4. A method of making 4-fluorophenol which comprises hydrolyzing 4-bromo-1-fluorobenzene by heating a mixture consisting of one gram molecular proportion of the 4-bromo-1-fluorobenzene from 0.125 to 1.25 gram molecular proportions of an alkaline earth metal hydroxide and water at reaction temperatures between 190° and 250° C. under a pressure at least as great as the autogenous pressure of the mixture of the materials and in the presence of a copper-containing catalyst and separating 4-fluorophenol from the reaction mixture.

5. A process as claimed in claim 4, wherein the alkaline earth metal hydroxide is calcium hydroxide.

6. A method of making 3-fluoro-p-cresol which comprises hydrolyzing 4-bromo-2-fluorotoluene by heating a mixture consisting of one gram molecular proportion of the 4-bromo-2-fluorotoluene, from 0.125 to 1.25 gram molecular proportions of calcium hydroxide and water at reaction temperatures between 190° and 250° C. under a pressure at least as great as the autogenous pressure of the mixture of the materials and in the presence of a copper-containing catalyst and separating 3-fluoro-p-cresol from the reaction mixture.

7. A method of making 3-fluorophenol which comprises hydrolyzing 3-bromo-1-fluorobenzene by heating a mixture consisting of one gram molecular proportion of the 3-bromo-1-fluorobenzene, from 0.125 to 1.25 gram molecular proportions of calcium hydroxide and water at reaction temperatures between 190° and 250° C. under a pressure at least as great as the autogenous pressure of the mixture of the materials and in the presence of a copper-containing catalyst and separating 3-fluorophenol from the reaction mixture.

8. A method of making 4-fluorophenol which comprises hydrolyzing 4-bromo-1-fluorobenzene by feeding a mixture comprising one gram molecular proportion of the 4-bromo-1-fluorobenzene, from 0.125 to 1.25 gram molecular proportions of calcium hydroxide and water into a hydrolysis zone, agitating and heating the mixture at temperatures between 190° and 250° C. under a pressure at least as great as the autogenous pressure of the mixture of the materials, and in the presence of a copper-containing catalyst, for a reaction time between 0.5 and 5 hours, passing the reaction mixture under pressure from the hydrolysis zone to a neutralization zone, cooling the mixture in the neutralization zone, then adding an acid selected from the group consisting of hydrochloric acid, hydrobromic acid and acetic acid, to the reaction mixture under pressure and in amount sufficient to bring the mixture to a pH value between 3 and 7, and thereafter withdrawing the mixture from the neutralization zone.

References Cited in the file of this patent

UNITED STATES PATENTS

| | | |
|---|---|---|
| 1,934,656 | Britton et al. | Nov. 7, 1933 |
| 2,085,429 | Herdieckerhoff | June 29, 1937 |

OTHER REFERENCES

Kraay, Chem. Abstracts, volume 20 (1926), page 2152 (1 page).

Hale at al., Ind. & Eng. Chem., volume 20 (Feb. 1928), pages 114–115 (2 pages).

De Crauw, Chem. Abstracts, volume 25 (1931), pages 4859–61 (3 pages).

Schiemann et al., Chem. Abstracts, volume 29 (1935), col. 7958 (1 page).

UNITED STATES PATENT OFFICE
CERTIFICATION OF CORRECTION

Patent No. 2,950,325                                              August 23, 1960

Edgar C. Britton et al.

It is hereby certified that error appears in the above numbered patent requiring correction and that the said Letters Patent should read as corrected below.

Columns 5 and 6, Table I, in Run No. 1, under the heading "gm. mole", first line, for "9.3" read -- 0.3 --; same Table I, in Run No. 9, under the heading "Yield, percent", ninth line, for "62.0" read -- 62.1 --.

Signed and sealed this 9th day of May 1961.

(SEAL)
Attest:

ERNEST W. SWIDER                                          DAVID L. LADD
Attesting Officer                                            Commissioner of Patents